US012239128B2

(12) United States Patent
Forst et al.

(10) Patent No.: US 12,239,128 B2
(45) Date of Patent: Mar. 4, 2025

(54) METHODS AND SYSTEMS FOR SPRAYING A PEST CONTROL COMPOSITION

(71) Applicant: S. C. JOHNSON & SON, INC., Racine, WI (US)

(72) Inventors: Matthew J. Forst, Oak Creek, WI (US); Megan L Nakkula, Milwaukee, WI (US); Bal K. Gautam, Franklin, WI (US); Arvind Narayan, Phoenix, AZ (US); Richard J. Lemerond, Racine, WI (US); Benjamin J. Richards, Shorewood, WI (US)

(73) Assignee: S. C. JOHNSON & SON, INC., Racine, WI (US)

( * ) Notice: Subject to any disclaimer, the term of this patent is extended or adjusted under 35 U.S.C. 154(b) by 559 days.

(21) Appl. No.: 17/683,585

(22) Filed: Mar. 1, 2022

(65) Prior Publication Data

US 2022/0279782 A1    Sep. 8, 2022

Related U.S. Application Data

(60) Provisional application No. 63/156,055, filed on Mar. 3, 2021.

(51) Int. Cl.
*A01N 25/06* (2006.01)
*A01M 1/20* (2006.01)
*A01M 13/00* (2006.01)
*A01N 27/00* (2006.01)
*B65D 83/14* (2006.01)
*B65D 83/20* (2006.01)
(Continued)

(52) U.S. Cl.
CPC ............. *A01N 25/06* (2013.01); *A01N 27/00* (2013.01); *B65D 83/752* (2013.01)

(58) Field of Classification Search
CPC ...... A01N 25/06; A01N 27/00; B65D 83/752; B65D 83/206; B65D 83/22; B65D 83/30; B65D 83/40; A01M 1/20; A01M 1/2094; A01M 13/00
See application file for complete search history.

(56) References Cited

U.S. PATENT DOCUMENTS 3,050,261 A    8/1962  Littlefield
5,752,631 A    5/1998  Yabuno et al.
(Continued)

FOREIGN PATENT DOCUMENTS

CN     204070245 U    1/2015
EP     1622449 B1    10/2007
(Continued)

OTHER PUBLICATIONS

LodiUK Organ-X Pro Freeze Spray, LodiUK, Copyright 2018, 11 pages, URL: https://www.lodi-uk.com/ (11 pages).
(Continued)

*Primary Examiner* — Trevor Love
(74) *Attorney, Agent, or Firm* — Quarles & Brady LLP

(57) ABSTRACT

An aerosol dispensing system includes a container having a liquefied petroleum gas (LPG) composition disposed therein, and an overcap assembly having an actuator and an exit orifice, the overcap assembly being coupled to the container. The pest control composition is sprayed wherein the pest control composition is sprayed at a spray rate of between about 1.8 g/s and about 2.6 g/s and at a temperature of less than −20° C. at least 18 inches from an exit orifice of the dispensing system.

8 Claims, 6 Drawing Sheets

(51) Int. Cl.
  B65D 83/22 (2006.01)
  B65D 83/30 (2006.01)

(56) References Cited

U.S. PATENT DOCUMENTS

| | | |
|---|---|---|
| 6,695,227 B1 | 2/2004 | Hayashi et al. |
| 6,729,559 B2 | 5/2004 | Zanma et al. |
| 8,596,557 B2 | 12/2013 | Yamamoto et al. |
| 9,862,535 B2 | 6/2018 | Christianson et al. |
| 2009/0039179 A1 | 2/2009 | Kado et al. |

FOREIGN PATENT DOCUMENTS

| | | |
|---|---|---|
| EP | 2245927 B1 | 10/2012 |
| EP | 2431100 B1 | 1/2014 |
| EP | 2389230 B1 | 9/2014 |
| EP | 1661458 B1 | 4/2017 |
| EP | 3486193 A1 | 5/2019 |
| EP | 2818045 B1 | 3/2020 |
| EP | 3398435 B1 | 3/2020 |
| JP | 05286805 A | 11/1993 |
| JP | 4217450 B2 | 2/2009 |
| JP | 2017100782 A | 6/2017 |
| JP | 6214135 B2 | 10/2017 |
| JP | 6506892 B2 | 4/2019 |
| NO | 2019078219 A1 | 4/2019 |
| WO | 2008064293 A2 | 5/2008 |
| WO | 2008064293 A3 | 5/2008 |
| WO | 2016030555 A1 | 3/2016 |
| WO | 2016163987 A1 | 10/2016 |
| WO | 2017018423 A1 | 2/2017 |
| WO | 2017098210 A1 | 6/2017 |
| WO | 2018081386 A1 | 5/2018 |
| WO | 201965906 A1 | 4/2019 |
| WO | 2019065905 A1 | 4/2019 |
| WO | 2019078220 A1 | 4/2019 |
| WO | 2019117164 A1 | 6/2019 |
| WO | 2020023112 A1 | 1/2020 |

OTHER PUBLICATIONS

PT Wasp-Freeze II Wasp and Hornet Insecticide, BASF, Jun. 19, 2019 (12 pages).
Wasp-Freeze II, Amazon Home, available for sale Nov. 4, 2014, 4 pages, URL: https://www.Amazon.in (4 pages).
PCT International Search Report and Written Opinion for PCT/US2022/018470, mailed Jul. 6, 2022, (11 pages).

METHODS AND SYSTEMS FOR SPRAYING A PEST CONTROL COMPOSITION

CROSS REFERENCE TO RELATED APPLICATIONS

This application claims the benefit of U.S. Provisional Application No. 63/156,055, filed on Mar. 3, 2021, and entitled "Methods and Systems for Spraying a Pest Control Composition," which is incorporated by reference herein in its entirety.

REFERENCE REGARDING FEDERALLY SPONSORED RESEARCH OR DEVELOPMENT

Not applicable

SEQUENCE LISTING

Not applicable

BACKGROUND OF THE INVENTION

1. Field of the Invention

The present disclosure relates generally to systems and methods of spraying pest control compositions, and more specifically, to systems and methods of spraying pest control compositions that only comprise liquefied petroleum gas (LPG), and that sufficiently immobilize insects by freezing without substantial knock down or dispersion thereof.

2. Description of the Background of the Invention

Pressurized containers are commonly used to store and dispense pressurized compositions, such as air fresheners, deodorants, insecticides, germicides, decongestants, perfumes, and the like. The pressurized compositions may or may not be combined with an active volatile material, and are stored in a pressurized and liquefied state within the container. The pressurized composition is forced from the container through an aerosol valve due to the pressure and quantity of composition within the container. A release valve with an outwardly extending valve stem may be provided to facilitate the release of the pressurized composition at a top portion of the container, whereby activation of the valve via the valve stem causes the composition to flow from the container through the valve stem and into the outside atmosphere. Such dispensing systems also typically include an actuator such as a trigger or a button. When activated by a user, the actuator causes a manifold to actuate a valve stem of a container. The manifold may include a spray insert having a discharge outlet that is in fluid communication with the valve stem.

In many places, consumers desire pest control compositions that are free from active compositions for use in a variety of settings around the home, particularly in the kitchen. Such pest control compositions are insecticide-free, do not include any mess or residue after spraying, and have little or no smell. Such active-less compositions are generally used to immobilize an insect for a minimum of two minutes. By immobilizing the insect for a minimum of two minutes, a consumer has time to dispose of the insect in a preferred way, i.e., throw in garbage, place outside, kill the insect, etc. With a full two second spray time, the insect typically stops moving almost immediately, and a visible cue of effectiveness is provided to the user who can see frost accumulate on the insect. Within several seconds after spraying and depending on the surface, the propellant evaporates, leaving no stain, residue, or smell.

Some pest control compositions that do not utilize any active compositions may use a propellant such as liquefied petroleum gas (LPG). Such compositions are capable of immobilizing insects, such as spiders, cockroaches, ants, bed bugs, flies, mosquitos, and wasps, with very cold air, e.g., air as low as −75° C. (−103° F.). Firing a frigid blast of cold air is capable of immobilizing varying sized insects, and allows the user to remove the insect(s) at their leisure. When using a LPG sprayer to immobilize insects, a user will shake the contents of the sprayer, and spray with soft and consecutive pressure, e.g., from 1 to 3 seconds. While spraying, the user generally maintains the sprayer at a 45 degree angle, at a spray distance of about 12.0 inches (30.5 cm) measured along a straight line between an exit orifice of a spray nozzle and the insect. However, spraying distances can vary between about 6.0 inches and about 18.0 inches measured along a straight line between the exit orifice of the spray nozzle and the insect. For best results, it is desirable to maintain a constant spray rate of the LPG composition to avoid blowing away insects.

Known LPG composition sprayers are generally capable of freezing the insects by maintaining the spray for one to three seconds, or until a white frost is visible. While various products exist that utilize varying combinations of LPG without an active pest control additive, such compositions generally suffer from being ineffective at longer spray distances, and by causing immobilized insects to be blown away from the spray site, causing unnecessary delay when spraying and disposing of insects.

There is therefore a need for an insecticide-free spray that is capable of immobilizing insects along a typical range of spraying distances without unnecessarily causing the insects to be blown away.

SUMMARY

A method of immobilizing insects by spraying a dispensing system that includes the steps of spraying a pest control composition consisting of butane, propane, and isobutane. The pest control composition is sprayed for at least two seconds at a spray rate of between about 1.8 g/s and about 2.6 g/s and achieves a temperature of less than −20° C. at least 18 inches from an exit orifice of the dispensing system. In some embodiments, the pest control composition is sprayed at a spray rate of between about 2.1 g/s and about 2.4 g/s. In some embodiments, the pest control composition is sprayed at a temperature of less than −30° C. at least 18 inches from an exit orifice of the dispensing system.

In some embodiments, the pest control composition is sprayed at a temperature of less than −40° C. at least 18 inches from an exit orifice of the dispensing system. In some embodiments, the pest control composition consists of about 76.1% v isobutane, about 23.5% v propane, and about 0.4% v butane. In some embodiments, the ratio of the spray temperature to spray rate is maintained at less than −15° C.-s/g from 6 in. to 18 in. measured along a straight line moving away from the exit orifice. In some embodiments, the ratio of the spray temperature to spray rate is maintained at less than −18° C.-s/g from 6 in. to 18 in. measured along a straight line moving away from the exit orifice.

In some embodiments, an aerosol dispensing system includes a container having a liquefied petroleum gas (LPG) composition disposed therein, and an overcap assembly having an actuator and an exit orifice, the overcap assembly being coupled to the container. The pest control composition is sprayed at a spray rate of between about 1.8 g/s and about 2.5 g/s and at a temperature of less than −20° C. at least 18 inches from an exit orifice of the dispensing system. In some embodiments, the pest control composition is sprayed at a spray rate of between about 2.1 g/s and about 2.4 g/s. In some embodiments, the pest control composition is sprayed at a temperature of less than −30° C. at least 18 inches from an exit orifice of the dispensing system.

In some embodiments, the pest control composition decreases in temperature from a distance 6 inches from the exit orifice to a distance 12 inches from the exit orifice. In some embodiments, the pest control composition consists of isobutane, propane, and butane. In some embodiments, the pest control composition consists of about 76.1% v isobutane, about 23.5% v propane, and about 0.4% v butane. In some embodiments, the ratio of the spray temperature to spray rate is maintained at less than −15° C.-s/g from 6 in. to 18 in. measured along a straight line moving away from the exit orifice. In some embodiments, the ratio of the spray temperature to spray rate is maintained at less than −18° C.-s/g from 6 in. to 18 in. measured along a straight line moving away from the exit orifice.

In some embodiments, the pest control composition includes a volume percentage of isobutane of between 50% v and 99% v, a volume percentage of propane of between 0.5% v and 50% v, and a volume percentage of butane of between 0.1% v and 40% v. In some embodiments, the pest control composition includes a volume percentage of isobutane of between 60% v and 85% v, a volume percentage of propane of between 10% v and 40% v, and a volume percentage of butane of between 0.2% v and 30% v.

In some embodiments, a composition for immobilizing insects consists of isobutane, propane, and butane, with a volume percentage of isobutane of between 70% v and 80% v, a volume percentage of propane of between 20% v and 30% v, and a volume percentage of butane of between 0.3% v and 20% v. In some embodiments, the volume percentage of isobutane is about 76.1% v, a volume percentage of propane is about 23.5% v, and a volume percentage of butane is about 0.4% v.

DETAILED DESCRIPTION OF THE DRAWINGS

Figure 1:
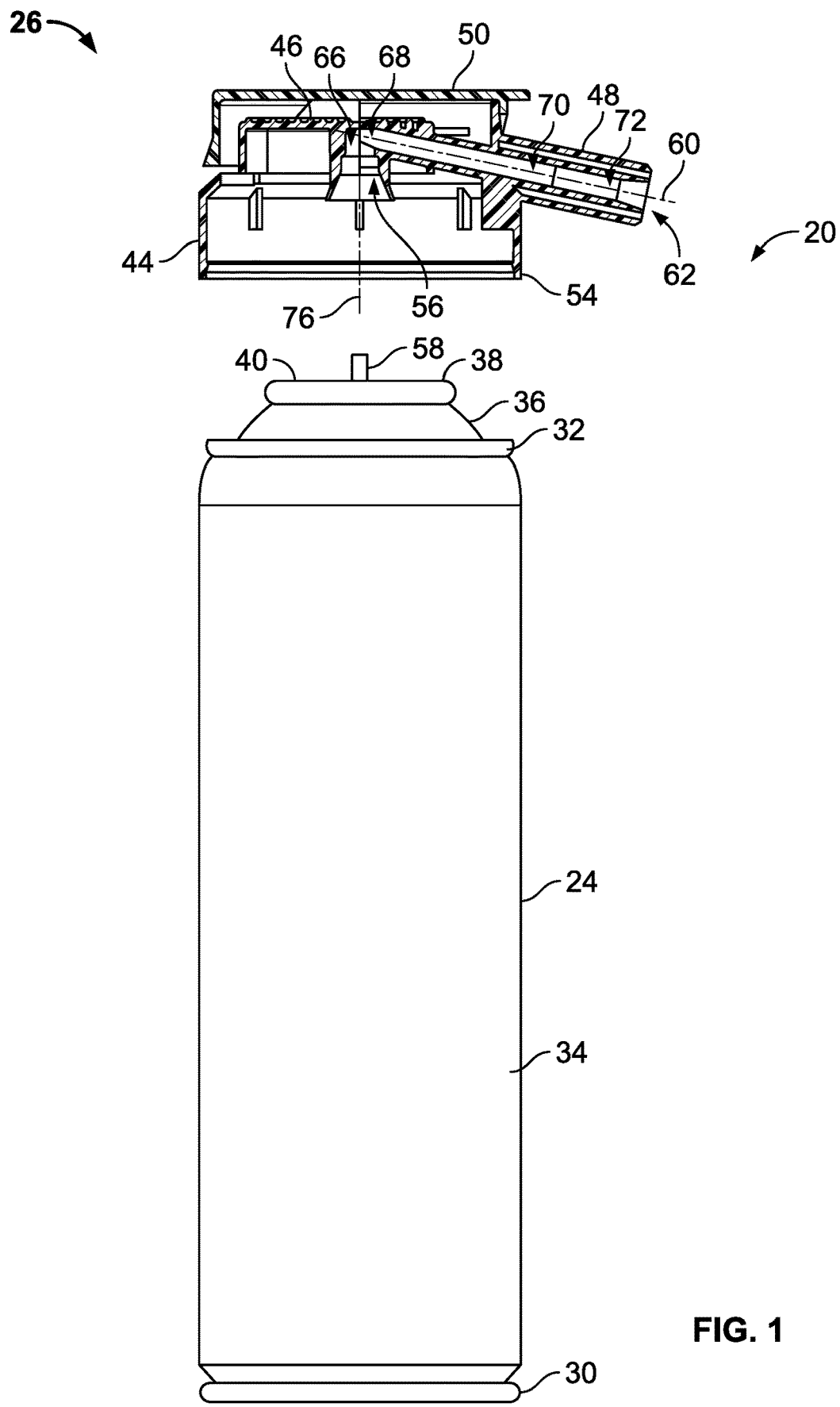
FIG. 1 is an exploded, partial cross-sectional view of a dispensing system containing a pest control composition as disclosed herein.

The present disclosure is directed to systems and methods for spraying a pest control composition that includes liquefied petroleum gas (LPG) and is free from active additives. The LPG composition disclosed herein maintains a constant spray at a low temperature along a straight line distance measured from an exit orifice of an actuator nozzle, while maintaining a relatively low spray rate and narrow spray zone, and reduces dispersion or blown away insects when spraying. While the methods and systems disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Throughout the disclosure, the terms "about" and "approximately" mean plus or minus 5% of the number that each term precedes. As used herein, the phrase "LPG composition" refers to a wide variety of gas mixtures that may form the pest control compositions that are discussed hereinafter. The LPG compositions may comprise varying combinations of isobutane, propane, and butane, among other hydrocarbons.

While various formulas of 100% propellant aerosols are known that spray sub-zero compositions that can immobilize insects without substantial variation of efficacy, these known compositions suffer from a variety of drawbacks. Importantly, most known sprayers and LPG compositions are ineffective at providing effective pest immobilization without causing substantial dispersion or blowing of the insect or insects being sprayed. Since household pests can encompass a wide variety of types and sizes, it is generally true that the smaller the pest being sprayed, the more likely the sprayer is to cause dispersion or blowing of the pest(s) during or after immobilization. The blowing of the insect can cause the insect to be blown into an unreachable area, or generally cause inefficiencies during pest control operations.

Various factors impact the efficacy of LPG compositions that are intended for use as pest control sprays, such as the temperature of the composition at various spray distances measured along a straight-line distance taken from the exit orifice of the sprayer. To that end, the makeup of the composition itself, along with the dispensing system, can impact the temperature and, thus, the effectiveness of such LPG compositions. While it is preferable to maintain a lower temperature farther away from the exit orifice of the nozzle assembly, e.g., below −20° C. or −30° C., reducing dispersion or blowing of the insects is also an important consideration. The compositions and methods of the present disclosure are capable of spraying a cold temperature along a greater straight-line distance from the exit orifice of a nozzle assembly, in such a way that sprayed insects are not blown away. As discussed herein, the term "blown away" refers to the act of causing insects to be swept from their feet or appendages, e.g., causing the insect to be completely separated from direct contact with the surface upon which it is resting for a period of time that is greater than at least 0.01 seconds.

Figure 2:
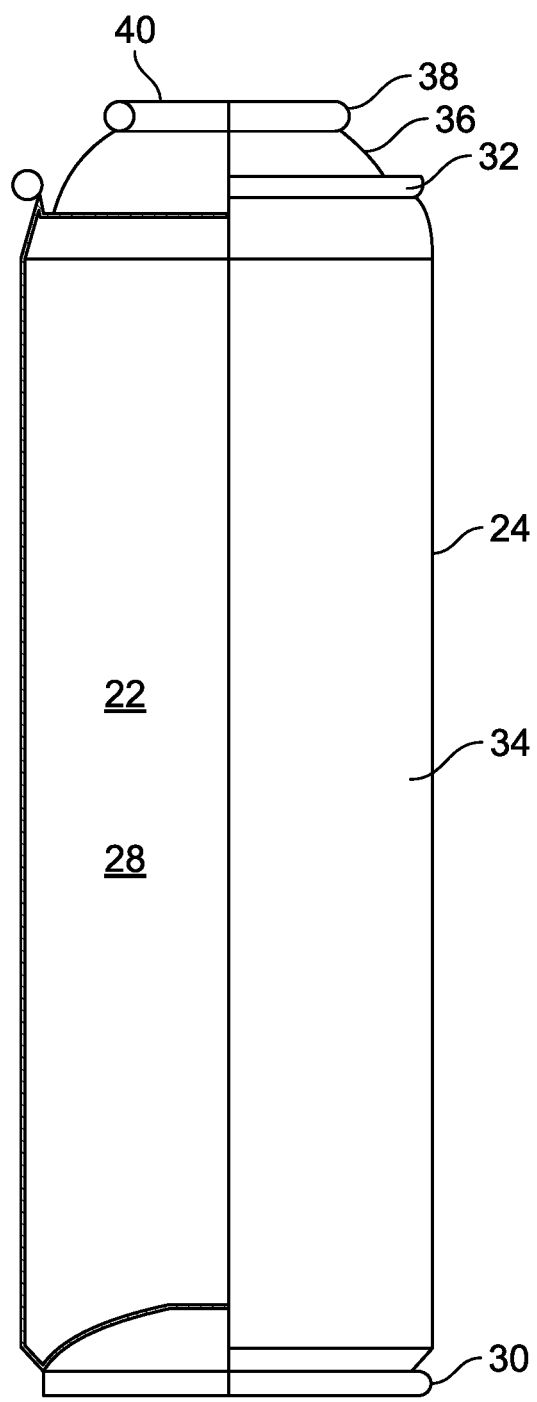
FIG. 2 is a quarter cross-sectional view of a container of the dispensing system of FIG. 1.
Figure 3:
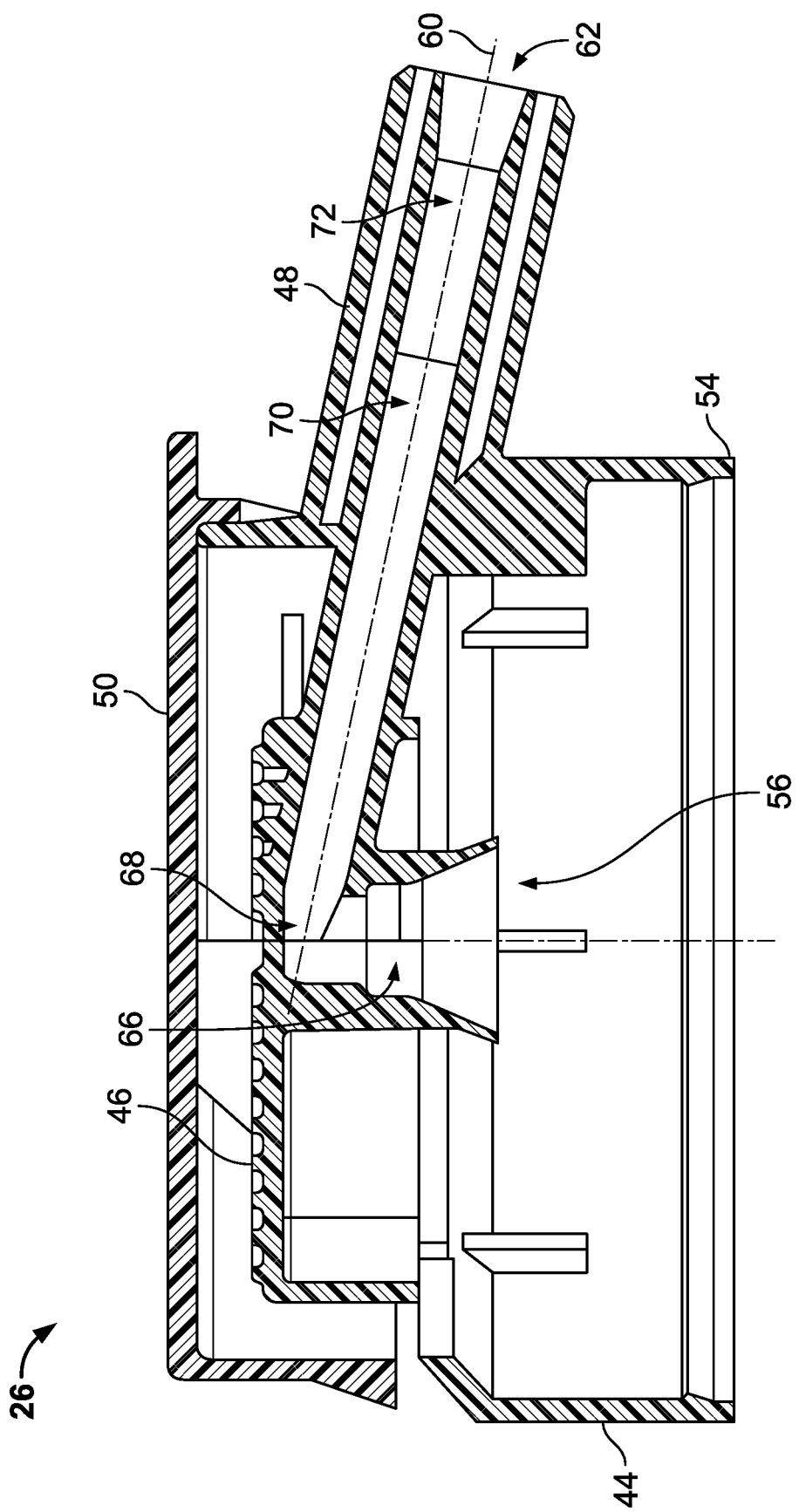
FIG. 3 is a cross-sectional view of an overcap assembly of the dispensing system of FIG. 1.

Referring to FIGS. 1-3, a dispensing system 20 is shown that is capable of spraying LPG compositions 22 as disclosed herein, which include mixtures of butane, propane, and isopropane. The dispensing system 20 includes a can or container 24 and an overcap assembly 26. Referring to FIG. 2, the LPG composition 22 is contained within an interior chamber 28 of the container 24. The container 24 includes a circular base 30 and a circular shoulder 32, with a body sidewall 34 extending between the base 30 and shoulder 32. An upper dome 36 extends from the shoulder 32 to a neck 38 that is disposed at an upper end 40 of the container 24. The base 30, the shoulder 32, and the neck 38 may take different forms than those shown in the present embodiment, and may be modified depending on a desired size or profile of the container 24 or the overcap assembly 26.

Referring to FIG. 1, the overcap assembly 26 is shown. The overcap assembly 26 includes a housing 44, an actuator 46, a nozzle extension 48, and a cap 50. In the illustrated embodiment, the housing 44, actuator 46, and nozzle extension 48 are integral components, and the cap 50 is a separable component. However, alternative embodiments may include an overcap assembly 26 that has components that are all separable, include fewer components than shown, or that include additional components, such as a separable nozzle insert (not shown). Still referring to FIG. 1, the housing 44 defines a lower end 54 that is configured to be coupled with the shoulder 32 of the container 24. A nozzle seat 56 of the actuator 46 is configured to be seated onto a valve stem 58 that extends from the upper end 40 of the container 24. The overcap assembly 26 further includes the nozzle extension 48, which allows for targeted spray of the LPG composition 22 to immobilize insects. The nozzle extension 48 defines a fluid passageway axis 60, which is collinear with and defines the straight line along which the various temperature measurements of the present disclosure are taken. An exit orifice 62 is defined at a distal end of the nozzle extension 48, the exit orifice 62 defining the starting point of the distances for the various temperature measurements of the present disclosure. For purposes of measurement, any distance may be calculated along a line from a point coextensive with the farthest point of structure defining the exit orifice 62, which allows for the emission of fluid out of the overcap assembly 26.

The actuator 46 is at least partially disposed within the housing 44 and facilitates the product being dispensed from the dispensing system 20. In use, the overcap assembly 26 is adapted to release a product from the container 24 upon the occurrence of a particular condition, such as the manual activation of the actuator 46 by a user of the dispensing system 20. The container 24 may alternatively contain various types of hydrocarbon gas, including acetylene, methane, propane, butane, isobutene, halogenated hydrocarbons, ethers, mixtures of butane and propane, otherwise known as liquid petroleum gas or LPG, and/or mixtures thereof. The product dispensing system 20 is therefore adapted to dispense any number of different products.

Still referring to FIG. 1, a vertical conduit 66 is shown extending upward, to an intersection 68 with a second or lateral conduit 70. The lateral conduit 70 extends from the intersection 68 toward a spray chamber 72 that may receive a nozzle insert (not shown). The vertical conduit 66, the lateral conduit 70, and the spray chamber 72 generally define a fluid passageway. When a user actuates the actuator 46 for dispensement, fluid travels through the valve stem 58, into the vertical conduit 66, and into the spray chamber 72, where the pressurized fluid exits through the exit orifice 62 into the surrounding atmosphere. The extension 48 may take a variety of shapes and sizes, and can provide for a more targeted spray of the LPG composition 22. The overcap 50 fits on the actuator 46 for distribution protection, and the valve stem 58 allows for a controlled spray rate over time.

The spray of the LPG composition 22 creates a cone-shaped spray pattern and defines a spray diameter of approximately 3 inches (in.) taken at a straight line distance of 18 in. from the exit orifice. In some embodiments, the cross-sections of the vertical conduit 66 and the lateral conduit 70 may be modified to adjust various pressures along the fluid passageway, which may necessarily result in higher or lower fluid pressures along the passageway when spraying the fluid. The vertical conduit 66 and the lateral conduit 70 may be modified in size depending on the various spray factors discussed herein, and the vertical conduit 66, the lateral conduit 70, and the spray chamber 72 define a manifold. As discussed hereinafter below, achieving a particular spray rate is desired to prevent blowing or disbursement of insects when spraying the LPG composition 22.

As best illustrated in FIG. 2, while the container 24 includes a cylindrical body 34, the container 24 may alternatively include a body 34 of any other shape. It is contemplated that the container 24 of the present disclosure may be a conventional aerosol container, which includes features that are externally or internally crimped to portions of the body 34, the shoulder 32, or the neck 38. A conventional valve assembly (not shown in detail) includes the valve stem 58 (see FIG. 1), which is connected to a valve body (not shown) and a valve spring (not shown) disposed within the container 24. The valve stem 58 extends upwardly through the neck 38, and is adapted to interact with the actuator 46 of the overcap assembly 26. A longitudinal axis 76 extends through the valve stem 58.

It is also contemplated that other types of containers or bottles may be used with the overcap assembly 26 disclosed herein. While the presently disclosed overcap assembly 26 exhibits particular advantages because of the controlled and continuous spray rate that is emitted therefrom, it is contemplated that the present overcap assembly could be used with other types of known containers. Further, such containers may broadly encompass any type of container adapted to hold an aerosolized substance or fluid and may be adapted for use as a standalone container and/or with a base or other dispenser housing.

As best illustrated in FIG. 1, prior to use, the actuator 46 is placed in fluid communication with the valve stem 58. A user may manually or automatically operate the actuator 46 to open the valve assembly, which causes a pressure differential between an interior of the container 24 and the atmosphere to force the contents of the container 24 out through the valve stem 58, through the manifold of the overcap assembly 26, and into the atmosphere. Various manufacturing considerations may be taken into account such as the container size, the overcap size, the type of product being dispensed, the actuator size, the manufacturing materials of the components, and the like. Further, it is contemplated that there may be variability in the height of the valve stem due to allowable manufacturing tolerances or from changes in the valve stem height over the use of the container, e.g., a container with compressed gas loses about 1 millimeter (mm) in valve stem height over the lifetime thereof.

It is also contemplated that a nozzle insert may be included, which may include a swirl chamber in fluid communication with one or more downstream recesses to assist in discharging fluid. Further, it is contemplated that the nozzle insert may impart one or more characteristics to the fluid including, but not limited to, a modification of the particle size of the fluid, a spray pattern of the fluid, a velocity of the fluid, a discharge rate of the fluid, or any other physical or chemical property of the fluid. In use, fluid flows from the passageway to the exit orifice 62. Thereafter, the fluid is ejected through the exit orifice 62 disposed at an outlet of the nozzle insert (not shown). The exit orifice 62 is generally circular in shape, but may be any other geometric shape. Various other components as known in the art may be optionally included in the passageway to affect the fluid as is known to those skilled in the art.

In use, the fluid is sprayed from the dispensing system 20 by exerting a force on the actuator 46. The force causes the actuator 46 to vertically translate from a non-actuation position to an actuation position. In a preferred embodiment, the actuator 46 translates between about 0.5 mm and about 10 mm, or between about 1 mm and about 8 mm from the non-actuation position to the actuation position. Upon removal of force from the actuator 46, actuator 46 returns to the non-actuation position. The actuator 46 is moved to the non-actuation position by the force of the valve stem 58 moving upwardly by the valve spring to close the valve assembly within the container 24.

The spraying system 58 shown in FIG. 1 is adapted to contain an LPG composition 22 having a formulation as disclosed herein. In some embodiments, the LPG composition 22 may include varying percentages, e.g., by volume or weight, that allow for a targeted cold spray at varying straight-line distances from an exit orifice of the nozzle extension. A preferred embodiment of the LPG composition 22 is provided in the table below, which is used to freeze or otherwise immobilize insects. As discussed above, variations to the LPG composition 22 may be made without departing from the scope of the present disclosure.

In some embodiments, the LPG composition 22 may include a volume percent of isobutane of between 50% v and 99% v, or between 60% v and 85% v, or between 70% v and 80% v, or about 76.1% v. The LPG composition 22 may include a weight percent of isobutane of between 50% w and 99% w, or between 60% w and 90% w, or between 75% w and 85% w, or about 79.8% w. In some embodiments, the LPG composition 22 may include a volume percent of propane of between 0.5% v and 50% v, or between 10% v and 40% v, or between 20% v and 30% v, or about 23.5% v. The LPG composition 22 may include a weight percent of propane of between 0.5% w and 50% w, or between 5.0% w and 40% w, or between 15% w and 30% w, or about 20.0% w. In some embodiments, the LPG composition 22 may include a volume percent of butane of between 0.1% v and 40% v, or between 0.2% v and 30% v, or between 0.3% v and 20% v, or about 0.4% v. The LPG composition 22 may include a weight percent of butane of between 0.05% w and 40% w, or between 0.1% w and 30% w, or between 0.15% w and 20% w, or about 0.2% w.

While the table below includes a particular LPG combination, the LPG combinations contemplated herein include varying proportions of propane, butane, isopropane, isobutane, and mixtures thereof. Other suitable propellants include, but are not limited to, hydrocarbons, halogenated hydrocarbons, ethers, carbon dioxide, compressed air, compressed nitrogen, and the like. Importantly, the LPG composition 22 does not include an active ingredient. The success criteria for all insects is based upon the duration that the insect is immobilized. As defined herein, an insect is considered immobilized when it is not crawling around or moving from one spot to another for a minimum of two minutes. All testing data disclosed herein is the result of testing that has been completed in a controlled setting on a single insect. The spray parameters discussed herein involve a two-second spray time, and a controlled spray rate was used, which was found to be effective for sufficiently immobilizing insects. A constant and relatively low spray rate allows for enough delivery of product yet not too forceful that it blows away smaller insects, e.g., ants or German cockroaches. The spray rate of the LPG composition 22 of Table 1 is between about 1.8 grams per second (g/s) and about 2.6 g/s, or between about 2.0. g/s and about 2.4 g/s, or about 2.3 g/s. The LPG composition 22 outlined in Table 1 has been found to work beneficially to immobilize German cockroaches, ants, spiders, and stink bugs.

TABLE 1

|  | Volume Percent | Percent | Weight Percent |
|---|---|---|---|
| Isobutane | 76.1% v | 72-84% | 79.8% w |
| Propane | 23.5% v | 15-30% | 20.0% w |
| Butane | 0.4% v | 0.1-1.2% | 0.2% w |

As the LPG composition 22 is dispensed, it vaporizes almost instantly and reaches a temperature of about −45° C. up to 18 in. from the exit orifice. The data included herein was gathered by acquiring temperature data at various straight-line distances measured from the exit orifice 62 of the overcap assembly 26. The measured temperatures taken at each straight-line distance is the minimum temperature measured during a two second spray of the LPG compositions 22 as well as any prior art LPG compositions discussed herein. Below is a table that includes a range of measured minimum temperatures for the LPG composition 22 of Table 1. The LPG composition 22 has the following temperature profile based on a spray distance measured from an end of the exit orifice 62 of the actuator 46.

TABLE 2

|  | Temperature (° C.) |
|---|---|
| 2 in. Distance | −43° C. to −46° C. |
| 12 in. Distance | −43° C. to −46° C. |
| 18 in. Distance | −38° C. to −44° C. |

Below is a table that shows experimental results from four of the dispensing systems 20 comprising the container 24 and overcap assembly 26 shown in FIGS. 1-3 and using the LPG composition 22 of Table 1.

TABLE 3

| | Distance of Spray | | | |
|---|---|---|---|---|
| Container | 2 in. | 6 in. | 12 in. | 18 in. |
| 1 | −43.3° C. | −44.3° C. | −45.1° C. | −41.3° C. |
| 2 | −45.3° C. | −43.9° C. | −45.8° C. | −42.5° C. |
| 3 | −44.1° C. | −45.9° C. | −46.8° C. | −43.2° C. |
| 4 | −42.1° C. | −45.1° C. | −46.3° C. | −42.8° C. |
| Average | −43.7° C. | −44.8° C. | −46.0° C. | −42.5° C. |

The spray rate of the LPG composition 22 of Table 1 allows for enough delivery of the LPG composition 22 to immobilize insects, but the spray rate is not so forceful that it blows away the insect. The spray rate is between 1.8 g/s and 2.6 g/s. In alternative embodiments, the spray rate is between 1.2 g/s and 3.0 g/s, or between 1.5 g/s and 2.7 g/s, or about 1.8 g/s, or about 1.9 g/s, or about 2.0 g/s, or about 2.1 g/s, or about 2.2 g/s, or about 2.3 g/s. The spray pattern of the LPG composition is preferably narrow and allows the low temperature of the spray to be maintained over the various distances, e.g., 6 in. distance, 12 in. distance, 18 in. distance, etc. The spray diameter at a 12 in. distance is between about 1.8 in. and about 2.5 in., and the spray diameter at an 18 in. distance is about 3.0 in.

Figure 4:
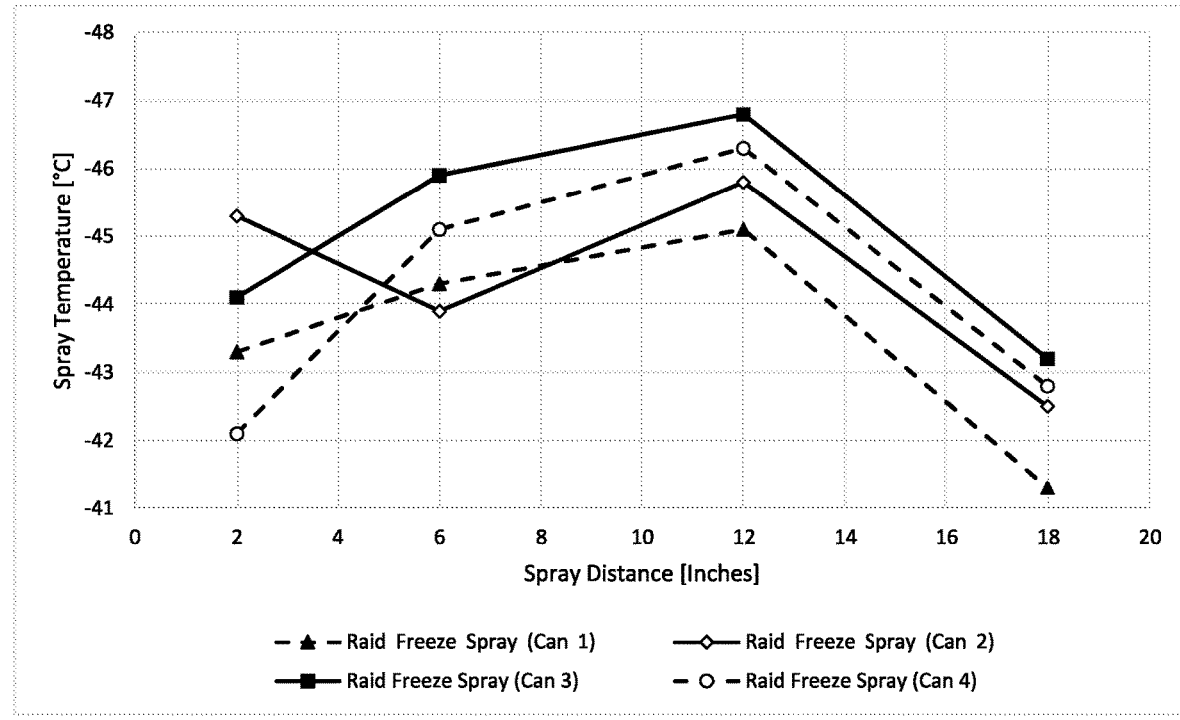
FIG. 4 is a graph illustrating the measured spray temperatures of an LPG composition as disclosed herein measured along a straight-line distance moving away from an exit orifice of a dispensing system.

As illustrated in Table 3 above and shown graphically in FIG. 4, the product dispensing system 20 sprays the LPG composition 22, which maintains a temperature of between about −40° C. to about −47° C. along a straight line distance of between 2 in. and 18 in. measured moving away from the exit orifice 62 of the dispensing system 20. As further depicted in Table 3, the LPG composition 22 achieved spray temperatures that range from about −40° C. to about −47° C., or from about −41° C. to about −46° C. At a spray distance of 2 in., the spray temperature was measured to be between about −42° C. and about −46° C. At a spray distance of 6 in., the spray temperature was measured to be between about −43° C. and about −46° C. At a spray distance of 12 in., the spray temperature was measured to be between about −45° C. and about −47° C. At a spray distance of 18 in., the spray temperature was measured to be between about −41° C. and about −44° C.

Figure 5:
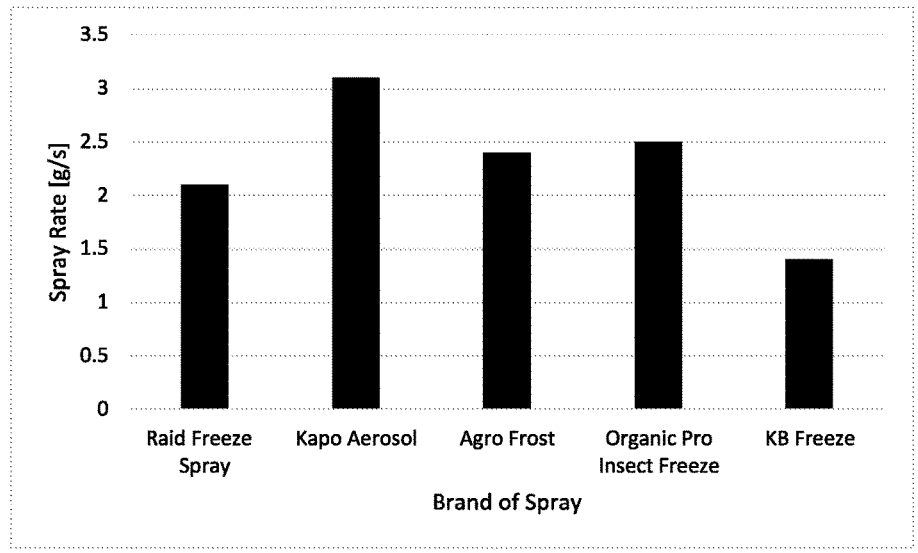
FIG. 5 is a graph illustrating the spray rate of an LPG composition as disclosed herein compared against four prior art LPG compositions.
Figure 6:
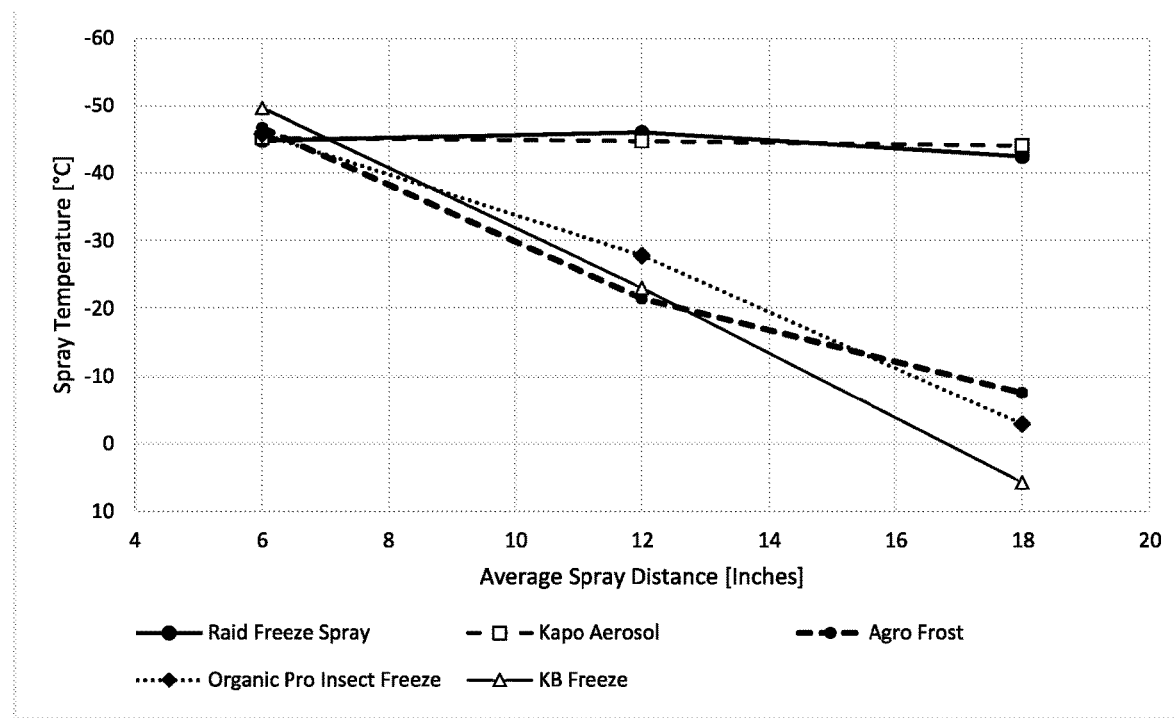
FIG. 6 is a graph illustrating the measured temperatures of the LPG compositions of FIG. 5 taken along a straight-line distance moving away from an exit orifice of various dispensing systems comprising various LPG compositions.

Now referring to Table 4 below and as illustrated in FIGS. 5 and 6, a comparison of four prior art LPG compositions is provided. The four LPG compositions are referred to as KAPO, Argo Frost, Organic Pro, and KB Freeze. The spray rates for each of the prior art LPG compositions was measured, and KAPO has a spray rate of about 3.1 g/s, Argo Frost has a spray rate of about 2.4 g/s, Organic Pro has a spray rate of about 2.5 g/s, and KB Freeze has a spray rate of about 1.4 g/s. The LPG composition 22, which is referred to as the "Raid® Freeze Spray" in FIGS. 4-8, has a spray rate of about 2.1 g/s. As is known in the art, the spray rate was measured by weighing the sprayer system a first time, spraying the can for a specific period of time, weighing the sprayer system a second time, and calculating the spray rate based on these measurements.

TABLE 4

|  | Spray Rate | Distance of Spray | | |
| --- | --- | --- | --- | --- |
|  |  | 6 in. | 12 in. | 18 in. |
| KAPO Can 1 | 3.1 g/s | −44.9° C. | −44.2° C. | −43.2° C. |
| KAPO Can 2 | 3.1 g/s | −45.5° C. | −45.2° C. | −44.9° C. |
| Argo Frost Can 1 | 2.4 g/s | −48.8° C. | −21.5° C. | −7.5° C. |
| Argo Frost Can 2 | 2.4 g/s | −44.5° C. | −21.4° C. | −7.5° C. |
| Organic Pro Can 1 | 2.5 g/s | −44.8° C. | −28.3° C. | −4.1° C. |
| Organic Pro Can 2 | 2.5 g/s | −46.7° C. | −27.3° C. | −1.6° C. |
| KB Freeze Can 1 | 1.4 g/s | −50.2° C. | −17.2° C. | 8.3° C. |
| KB Freeze Can 2 | 1.4 g/s | −49.1° C. | −28.8° C. | 3.3° C. |

As illustrated in Table 4 above and shown graphically in FIG. 5, at a spray distance of 6 in., KAPO had a spray temperature of between −44.9° C. and −45.5° C., Argo Frost had a spray temperature of between −44.5° C. and −48.8° C., Organic Pro had a spray temperature of between 44.8° C. and −46.7° C., and KAPO had a spray temperature of between −49.1° C. and −50.2° C. At a spray distance of 12 in., KAPO had a spray temperature of between −44.2° C. and −45.2° C., Argo Frost had a spray temperature of between −21.4° C. and −21.5° C., Organic Pro had a spray temperature of between −27.3° C. and −28.3° C., and KB Freeze had a spray temperature of between −17.2° C. and −28.8° C. At a spray distance of 18 in., KAPO had a spray temperature of between −43.2° C. and −44.9° C., Argo Frost had a spray temperature of −7.5° C., Organic Pro had a spray temperature of between −1.6° C. and −4.1° C., and KB Freeze had a spray temperature of between 3.3° C. and 8.8° C.

As indicated in by the data in Table 3, the LPG composition 22 that is expelled from the dispensing system 20 maintains a lower spray temperature moving away from the exit orifice than each of Argo Frost, Organic Pro, and KB Freeze of the prior art LPG compositions. As noted above, having a lower temperature at a range of distances from the exit orifice 62 of a nozzle assembly is beneficial to more effectively immobilize insects. As shown in Table 4, Argo Frost, Organic Pro, and KB Freeze have compositions and use dispensers that provide for an increase in temperature as the spray distance increases, which is likely due to a variety of factors including the specific LPG compositions, the various dispensing systems used, and the spray rate of the prior art compositions. Therefore, Argo Frost, Organic Pro, and KB Freeze are less effective for immobilizing insects as the distance from their respective exit orifices increases. For example, the spray temperature of Argo Frost increases by about 39.2° C. as the spray distance increases from 6 in. to 18 in. The spray temperature of Organic Pro increases by about 42.9° C. as the spray distance increases from 6 in. to 18 in. Additionally, the spray temperature of KB Freeze increases by about 55.5° C. as the spray distance increases from 6 in. to 18 in. The average spray temperatures of all four prior art LPG compositions is shown in Table 5 below.

TABLE 5

|  | Spray Rate | Average Distance of Spray | | |
| --- | --- | --- | --- | --- |
|  |  | 6 in. | 12 in. | 18 in. |
| KAPO Can AVG | 3.1 g/s | −45.2° C. | −44.7° C. | −44.1° C. |
| Argo Frost Can AVG | 2.4 g/s | −46.7° C. | −21.5° C. | −7.5° C. |
| Organic Pro Can AVG | 2.5 g/s | −45.8° C. | −27.8° C. | −2.9° C. |
| KB Freeze Can AVG | 1.4 g/s | −49.7° C. | −23.0° C. | 5.8° C. |

Achieving and maintaining a lower spray temperature at a variety of spray distances has the benefit of being able to immobilize a greater variety of insects across a range of spray distances. The spray diameter at a 12 in. distance is between about 1.8 in. and about 2.5 in., and the spray diameter at an 18 in. distance is about 3.0 in. The dispensing system 20, as shown in FIG. 3 has a composition that may increase spray temperature by only 1.3° C. as the spray distance increases from 2 in. to 18 in., thus providing more favorable results for immobilizing insects at a greater distance.

Figure 7:
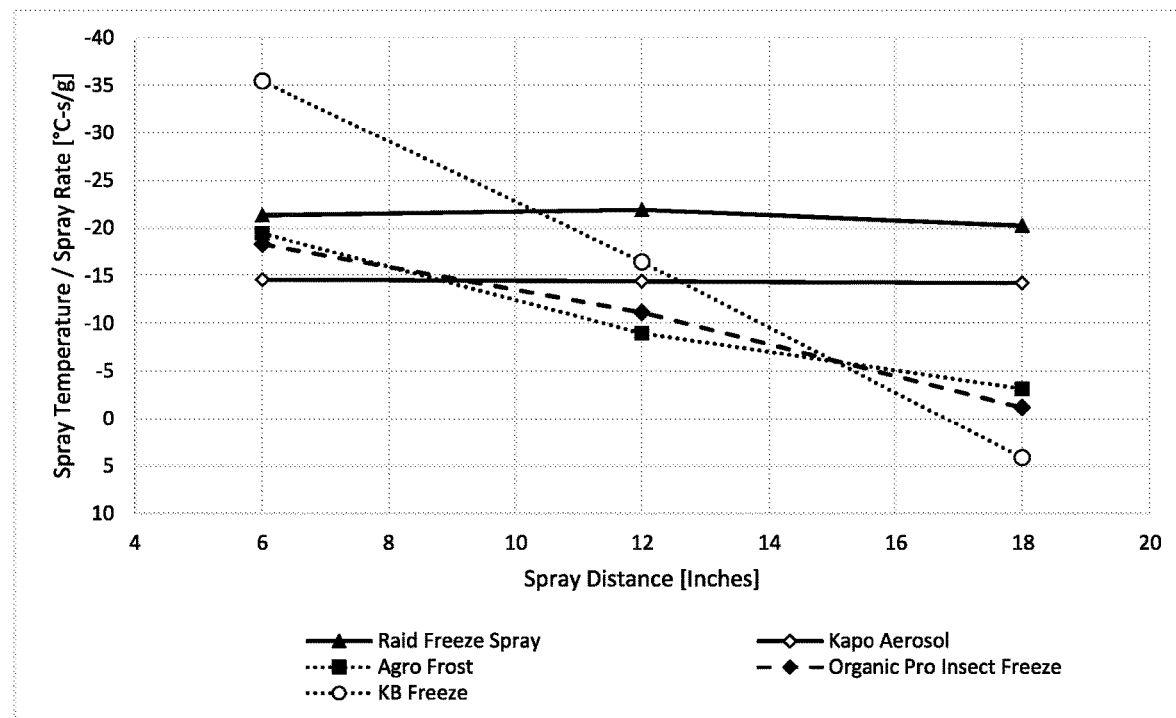
FIG. 7 is a graph illustrating a ratio comparison of the measured spray temperatures and spray rates of the LPG compositions of FIG. 5 with the measured temperatures taken along a straight-line distance moving away from an exit orifice of various dispensing systems.
Figure 8:
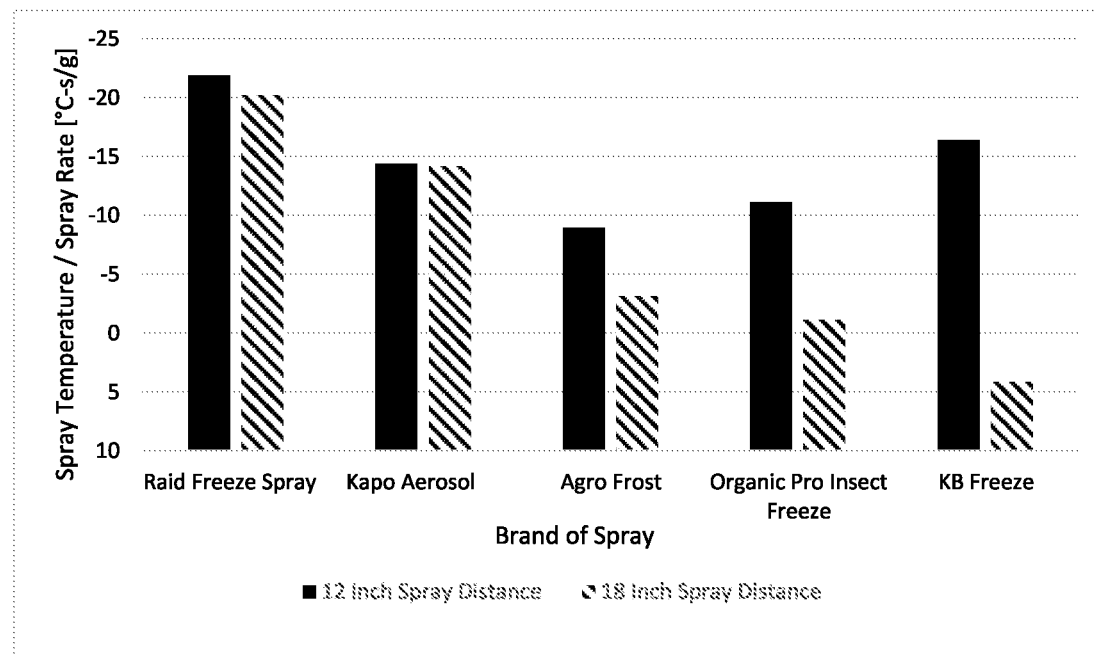
FIG. 8 is a graph illustrating the comparisons of FIG. 7 measured at 12 inches and 18 inches from the exit orifices of the various dispensing systems.

As illustrated in Table 6 below and shown graphically in FIGS. 7 and 8, the ratios of average spray temperature to spray rate of the prior art LPG compositions are compared to ratios of spray temperature to spray rate of the product dispensing system 20 at spray distances of 6 in., 12 in., and 18 in. As discussed above, it is desirable to reduce or eliminate the blowing away of insects during spraying, while maintaining a sufficiently low enough temperature to provide for adequate immobilization of the insects. The LPG compositions 22 described herein provide for such desirable outcomes by having a relatively low spray rate, e.g., 1.8 g/s-2.6 g/s, while maintaining a low temperature farther away from the exit orifice 62. In contrast, and as shown in FIGS. 7 and 8, the prior art LPG compositions are either incapable of maintaining a sufficiently low temperature at a farther distance from the exit orifice, or include too high of a spray rate, which can cause unnecessary or undesired blowing or dispersion of insects.

The data shown in Table 6 below is reflective of the ratios described above, which are defined herein as coefficients of enhanced immobilization and reduced dispersion of insects, e.g., a Spray Efficacy. It is more preferable to have a Spray Efficacy with a lower value, i.e., more negative, because such a value indicates that the LPG composition and sprayer combination being utilized can sufficiently immobilize an insect without causing it to blow away. An added economic benefit results from the fact that a lower Spray Efficacy generally indicates that less LPG product is required to immobilize insects, which is beneficial to both the consumer and producer. By requiring less product to immobilize insects, the insects will generally not be blown away when the LPG composition is sprayed, which is an undesirable effect of known LPG compositions that have a higher Spray Efficacy value. A higher spray rate means that more product is being released over time to immobilize insects. Therefore, insects are more likely to be blown over or ineffectively immobilized.

TABLE 6

Ratio of Spray Temperature to Spray Rate at a Distance

| Distance | Rapid Freeze | KAPO | Argo Frost | Organic Pro | KB Freeze |
|---|---|---|---|---|---|
| 6 in. | −21.33° C.-s/g | −14.58° C.-s/g | −19 44° C.-s/g | −18.30° C.-s/g | −35.46° C.-s/g |
| 12 in. | −21.90° C.-s/g | −14.42° C.-s/g | −8.94° C.-s/g | −11.12° C.-s/g | −16.43° C.-s/g |
| 18 in. | −20.21° C.-s/g | −14.21° C.-s/g | −3.13° C.-s/g | −1.14° C.-s/g | 4.14° C.-s/g |

With respect to the freeze spray disclosed herein, at 12 in., the product dispensing system 20 may have a ratio of spray temperature to spray rate of between about −17° C.-s/g and about −26° C.-s/g, or between about −20° C.-s/g and about −23° C.-s/g, or between about −21° C.-s/g and about −22° C.-s/g, or about −21° C.-s/g, or about −22° C.-s/g. Additionally, at 18 in., the product dispensing system 20 may have a ratio of spray temperature to spray rate of between about −15° C.-s/g and about −25° C.-s/g, or between about −17° C.-s/g and about −23° C.-s/g, or between about −19° C.-s/g and about −21° C.-s/g, or about −20° C.-s/g, or about −21° C.-s/g.

As illustrated in Table 6, the product dispensing system 20 has a ratio of spray temperature to spray rate or, a Spray Efficacy, of from about −21.3° C.-s/g at a spray distance of 6 in. to about −20.2° C.-s/g at a spray distance of 18 in. The product dispensing system 20 has a ratio of spray temperature to spray rate that increases by about 1.0° C.-s/g from 6 in. to 18 in. KAPO has a ratio of spray temperature to spray rate that ranges from about −14.6° C.-s/g at a spray distance of 6 in. and about −14.2° C.-s/g at a spray distance of 18 in. The ratio of spray temperature to spray rate of KAPO is on average about 6.8° C.-s/g higher than that of the product dispensing system 20. Argo Frost has a ratio of spray temperature to spray rate that ranges from about −19.4° C.-s/g at a spray distance of 6 in. to about −3.1° C.-s/g at a spray distance of 18 in.

The ratio of spray temperature to spray rate for Argo Frost increases by about 16.3° C.-s/g from 6 in. to 18 in., which is about 15.3° C.-s/g higher than the increase in ratio of spray temperature to spray rate of the product dispensing system 20. Organic Pro has a ratio of spray temperature to spray rate that ranges from about −18.3° C.-s/g at 6 in. to about −1.1° C.-s/g at 18 in. The ratio of spray temperature to spray rate for Organic Pro increases by 17.2° C.-s/g from 6 in. to 18 in., which is about 16.16° C.-s/g larger than the increase in the ratio of spray temperature to spray rate of the product dispensing system 20. Additionally, KB Freeze has a ratio of spray temperature to spray rate that ranges from about −35.5° C.-s/g at 6 in. to about 4.1° C.-s/g at 18 in. The ratio of spray temperature to spray rate for KB Freeze increases by 39.6° C.-s/g from 6 in. to 18 in., which is about 38.6° C.-s/g larger than the increase in ratio of spray temperature to spray rate of the product dispensing system 20.

As illustrated in FIG. 8 and described above, the product dispensing system 20 has a Spray Efficacy with a lower value, i.e., a lower or "more negative" ratio of spray temperature to spray rate, than the four known LPG compositions noted above. For example, at a spray distance of 12 in., KAPO has a Spray Efficacy of about −14.2° C.-s/g, Argo Frost has a Spray Efficacy of about −8.9° C.-s/g, Organic Pro has a Spray Efficacy of about −11.1° C.-s/g, and KB Freeze has a Spray Efficacy of about −16.4° C.-s/g. Additionally, at a spray distance of 18 in., KAPO has a ratio of spray temperature to spray rate of about −14.2° C.-s/g, Argo Frost has a Spray Efficacy of about −3.12° C.-s/g, Organic Pro has a Spray Efficacy of about −1.14° C.-s/g, and KB Freeze has a Spray Efficacy of about 4.14° C.-s/g. As such, the product dispensing system 20 is able to maintain a lower Spray Efficacy than all four prior art LPG compositions at a spray distance of between 12 in. and 18 in. As such, the product dispensing system 20 is able to maintain a more consistent ratio of spray temperature to spray rate at greater spray distances than any of the prior art compositions, thereby allowing for a more effective way of immobilizing insects at greater distances from the exit orifice Any of the embodiments described herein may be modified to include any of the structures or methodologies disclosed in connection with different embodiments. Further, the present disclosure is not limited to aerosol containers of the type specifically shown. Still further, the overcaps of any of the embodiments disclosed herein may be modified to work with any type of aerosol or non-aerosol container.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A method of immobilizing insects by a spray dispensing system, including the steps of:
   spraying a pest with a pest control composition consisting of butane, propane, and isobutane,
   wherein the pest control composition is sprayed for at least two seconds at a spray rate of between about 1.8 g/s and about 2.6 g/s and achieves a temperature of less than −20° C. at least 18 inches from an exit orifice of the dispensing system.

2. The method of claim 1, wherein the pest control composition is sprayed at a spray rate of between about 2.1 g/s and about 2.4 g/s.

3. The method of claim 1, wherein the pest control composition is sprayed at a temperature of less than −30° C. at least 18 inches from an exit orifice of the dispensing system.

4. The method of claim 1, wherein the pest control composition is sprayed at a temperature of less than −40° C. at least 18 inches from an exit orifice of the dispensing system.

5. The method of claim 1, wherein the pest control composition decreases in temperature from a distance 6 inches from the exit orifice to a distance 12 inches from the exit orifice.

6. The method of claim 1, wherein the pest control composition consists of about 76.1% v isobutane, about 23.5% v propane, and about 0.4% v butane.

7. The method of claim 1, wherein the ratio of the spray temperature to spray rate is maintained at less than −15° C.-s/g from 6 in. to 18 in. measured along a straight line moving away from the exit orifice.

8. The method of claim 1, wherein the ratio of the spray temperature to spray rate is maintained at less than −18° C.-s/g from 6 in. to 18 in. measured along a straight line moving away from the exit orifice.

* * * * *